2 Sheets--Sheet 1.

J. OESTERLING.

Manufacture of Stemmed Glassware.

No. 6,151. Reissued Nov. 24, 1874.

WITNESSES

James Q. Kay

Frederick Staudish

INVENTOR

John Oesterling by Bakewell & Klein

Attorneys

2 Sheets--Sheet 2.

J. OESTERLING.

Manufacture of Stemmed Glassware.

No. 6,151. Reissued Nov. 24, 1874.

WITNESSES

James E. Kay

Frederick Standish

INVENTOR

John Oesterling by Bakewell & Kerr

Attorneys

UNITED STATES PATENT OFFICE.

JOHN OESTERLING, OF WHEELING, WEST VIRGINIA.

IMPROVEMENT IN THE MANUFACTURE OF STEMMED GLASSWARE.

Specification forming part of Letters Patent No. 132,216, dated October 15, 1872; reissue No. 6,151, dated November 24, 1874; application filed May 6, 1874.

*To all whom it may concern:*

Be it known that I, JOHN OESTERLING, of Wheeling, in the county of Ohio and State of West Virginia, have invented a new and useful Method of Manufacturing Pressed Footed Tumblers and Stemmed or Legged Glassware, by which the same can be made without mold-joint demarkations, so as to resemble blown glassware, which, as ordinarily made, is very expensive, because requiring workmen of great skill to produce ware of uniform size and appearance; and I do hereby declare that the following is a full, clear, and exact description of the same and the mechanism I make use of for producing it, reference being made to the annexed drawing making a part of this specification, in which—

Figure 1:
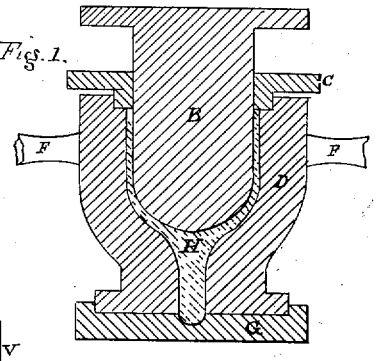
Figure 2:
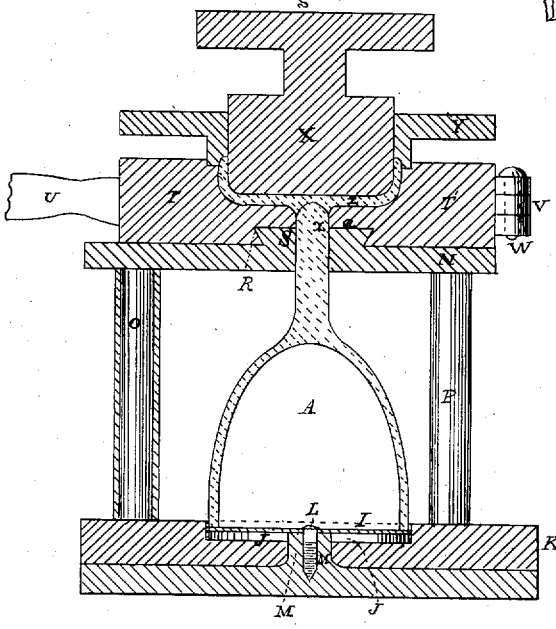
Figure 4:
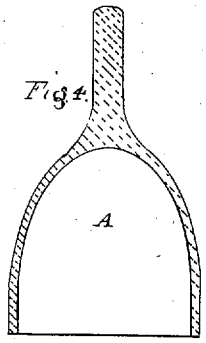
Figure 3:
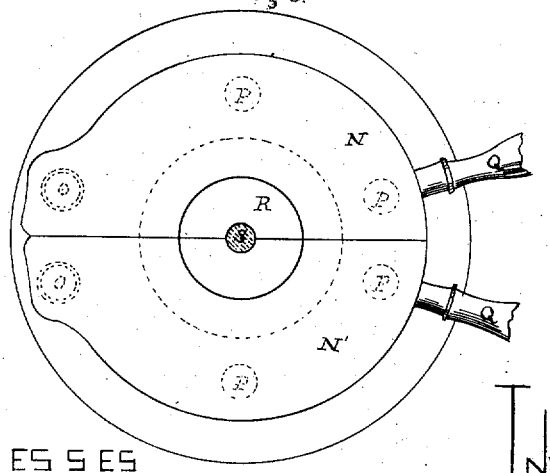
Figure 5:
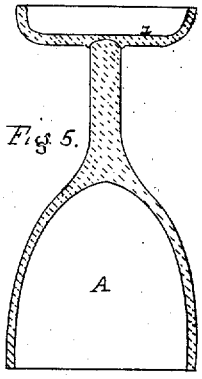
Figure 6:
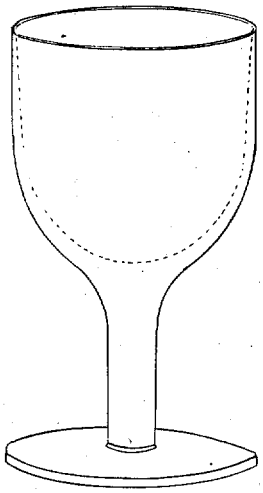
Figure 7:
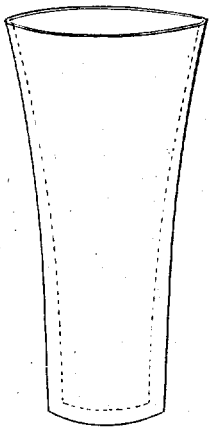
Figure 7:
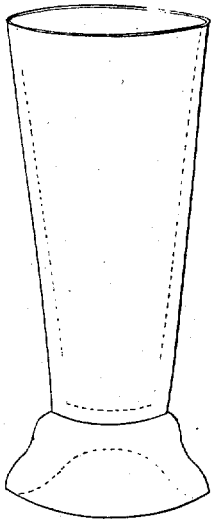
Figure 8:
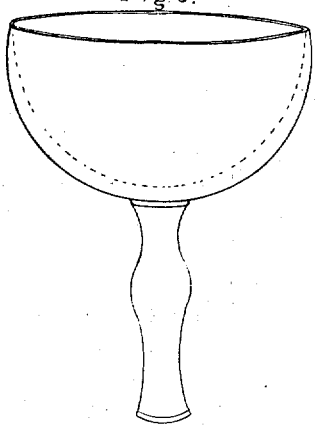
Figure 8:
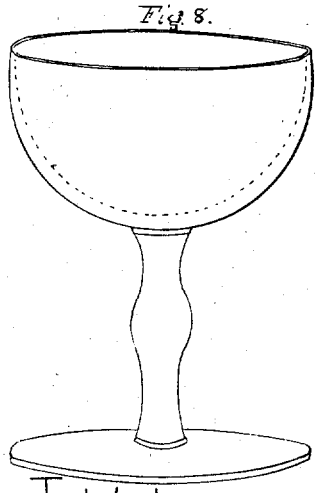

Figure 1 represents a sectional view of the bowl and stem mold and plunger; Fig. 2, a sectional view of the foot-mold and supporting-frame; Fig. 3, a top view of the same. Fig. 4 shows the stemmed bowl as it leaves the mold. Fig. 5 shows the same with the foot pressed on before finishing. Fig. 6 shows the finished product; and Figs. 7 and 8 show champagne and weiss-beer glasses, before and after finishing, made by my method.

To enable those skilled in the art to make and use my invention, I will proceed to describe its construction and working.

The stemmed bowl A, as shown in Fig. 4, is pressed in a jointless mold, Fig. 1, in which B represents the plunger; C, the plunger-ring; D, the solid mold; F F, its handles, and G the loose bottom. H shows the molten glass pressed between the plunger and mold. The mold is then lifted off the loose bottom G and turned over to deliver the stemmed bowl, which is either taken and reheated to undergo the fire-polish, or, while yet in a very hot state, is carried and deposited on the supporting-frame I.

The supporting-frame and foot-mold are constructed as follows: K is the base-plate of the supporting-frame. J is a circular recess cut therein to receive the spring-plate I, held by a counter-screw, L, to the central projection M of the base-plate.

The spring-plate I is composed, preferably, of a circular piece of metal cut from an ordinary carpenter's saw, and fits the recess J loosely. Its office is to form an elastic bearing-surface for the stemmed bowl while the foot is being pressed onto the latter to prevent its cracking or other injury.

N N′ is the sectional supporting-plate, each section pivoted to a rod, O, their front ends supported by legs P, which slide and rest on the base-plate, and are opened and closed by handles Q. On the center of the supporting-plates is the divided dovetail R, with a hole, S, passing through its center and that of the supporting-plate, for receiving the end of the stem of the partially-formed glass, as seen at *x*, Fig. 2. T T′ represent the sections of the foot-mold, with cavities *a* for clasping the dovetail R, as usual; U, its handles; V, its hinge-lugs, two being on one section of the mold, and one on the other, through which passes the pivot W. X is the plunger, and Y the plunger-ring. Z represents the molten glass for forming the foot pressed onto the stem between the plunger and mold.

The article is removed in the usual way, and is then finished by reheating, and the foot flared out into the usual disk shape, as shown in Fig. 6.

The pressure for forming and uniting the foot to the base is necessarily so light as to produce no mold-joint ridges or seams upon the foot.

I am aware that articles having small connecting parts or stems, such as lamps, goblets, wine-glasses, and similar articles, have been made in two separate parts, and united while yet in the mold, and at temperatures sufficiently high to cause them to form a perfect union. In such cases a sectional mold is necessarily used, and, consequently, the article comes from the mold having fins or ridges corresponding to the junction of the parts of the mold; whereas it is the special object of my method to produce such article free from all mold-marks, and thus resembling blown glassware.

Having now described my invention, what I claim as new, and desire to secure by Letters Patent, is—

The process hereinbefore described for making stemmed glassware by pressing the bowl and stem in one solid mold, and the foot-piece in a sectional mold, so as to avoid mold-marks on the surface of the bowl, and attaching the stem and foot-piece by pressing one onto the other while sufficiently hot to cause them to unite without distortion.

In witness whereof I, the said JOHN OESTERLING, have hereunto set my hand.

JOHN OESTERLING.

Witnesses:

WM. L. EWING,

WM. GÖRING.